United States Patent
Ratajac (10) Patent No.: US 9,541,029 B2
(45) Date of Patent: Jan. 10, 2017

(54) HYBRID IFS WITH METALLIC AFT SECTION

(71) Applicant: ROHR, INC., Chula Vista, CA (US)

(72) Inventor: Aleksandar Ratajac, San Diego, CA (US)

(73) Assignee: Rohr, Inc., Chula Vista, CA (US)

(*) Notice: Subject to any disclaimer, the term of this patent is extended or adjusted under 35 U.S.C. 154(b) by 318 days.

(21) Appl. No.: 14/275,834

(22) Filed: May 12, 2014

(65) Prior Publication Data

US 2015/0322984 A1 Nov. 12, 2015

(51) Int. Cl.
*F02K 1/82* (2006.01)
*F16B 5/04* (2006.01)
*F16B 5/00* (2006.01)
*F01D 25/24* (2006.01)
*F16B 5/01* (2006.01)

(52) U.S. Cl.
CPC ............... *F02K 1/82* (2013.01); *F16B 5/0004* (2013.01); *F16B 5/04* (2013.01); *F01D 25/24* (2013.01); *F01D 25/243* (2013.01); *F16B 5/01* (2013.01); *Y10T 403/64* (2015.01); *Y10T 403/645* (2015.01)

(58) Field of Classification Search
None
See application file for complete search history.

(56) References Cited

U.S. PATENT DOCUMENTS

| | | | | |
|---|---|---|---|---|
| 3,020,986 A * | 2/1962 | Kirk | ........................ | B64C 3/00 428/116 |
| 3,364,097 A * | 1/1968 | Dunnington | ............ | E04B 1/942 428/117 |
| 4,509,616 A * | 4/1985 | Blecherman | .......... | F01D 25/243 428/116 |
| 4,917,747 A * | 4/1990 | Chin | ....................... | B29C 53/04 428/116 |
| 5,041,318 A * | 8/1991 | Hulls | .................... | F16B 11/006 428/110 |
| 5,083,426 A * | 1/1992 | Layland | ..................... | F02K 1/78 428/116 |
| 6,637,186 B1 * | 10/2003 | Van Duyn | ............... | F01D 11/12 415/9 |
| 8,092,164 B2 * | 1/2012 | Moon | ..................... | F01D 25/24 415/200 |
| 2012/0181359 A1 * | 7/2012 | Welch | ....................... | B32B 3/12 239/589 |
| 2014/0030087 A1 * | 1/2014 | Soria | ........................ | F02K 1/72 415/213.1 |
| 2014/0077031 A1 * | 3/2014 | Benedetti | .................. | B32B 3/12 428/593 |

* cited by examiner

*Primary Examiner* — David Sample
*Assistant Examiner* — Nicholas W Jordan
(74) *Attorney, Agent, or Firm* — Snell & Wilmer, L.L.P.

(57) ABSTRACT

A hybrid inner fixed structure is disclosed. The inner fixed structure may have an inner fixed structure panel having an inner fixed structure panel surface and an inset panel having an inset panel surface disposed in at least partial contact with a first portion of the inner fixed structure panel surface. In this manner, a hybrid inner fixed structure may be designed to be both lightweight and heat tolerant.

14 Claims, 4 Drawing Sheets

HYBRID IFS WITH METALLIC AFT SECTION

FIELD

The present invention relates to an inner fixed structure ("IFS") for a turbine engine, and more particularly, an IFS with enhanced heat tolerance.

BACKGROUND

Turbine engines typically have an internal fixed structure that wraps around the engine and forms the inner surface of the fan duct. Often times, it is desirable to make the IFS from a lightweight material, such as graphite. However, portions of the IFS are exposed to very high temperatures and traditionally require additional shielding. Often, heat blankets cover portions of the IFS; however, these blankets are prone to degradation, damage, and failure. Thus, an IFS with enhanced heat tolerance is desired.

SUMMARY

A hybrid inner fixed structure is disclosed. The hybrid inner fixed structure may have an inner fixed structure panel having an inner fixed structure panel surface, a inset panel having a inset panel surface disposed in at least partial contact with the inner fixed structure panel surface, whereby the inset panel provides thermal insulation to the inner fixed structure panel surface. The hybrid inner fixed structure may also have a flange attachment boundary defined by the inset panel surface.

The hybrid inner fixed structure panel may have an upper bifurcation, a center member having an upper boundary and a lower boundary, and a lower bifurcation. In various embodiments, the upper bifurcation unites with the center member at the upper boundary and the lower bifurcation unites with the center member at the lower boundary. The upper bifurcation may extend substantially normal to the surface of the center member at the upper boundary, the lower bifurcation may extend substantially normal to the surface of the center member at the lower boundary, and at least one of the upper bifurcation, the center member, and the lower bifurcation may be disposed in at least partial contact with the inner fixed structure panel surface.

In various embodiments the inset panel may have a central inset portion adapted to cover a portion of the central cylindrical member of the inner fixed surface defined by a flange attachment boundary, an upper bifurcation inset portion adapted to cover a portion of the upper bifurcation portion of the inner fixed surface defined by the flange attachment boundary, and a lower bifurcation inset portion adapted to cover a portion of the lower bifurcation portion of the inner fixed surface defined by the flange attachment boundary.

The flange attachment boundary may have an upper terminal edge having a radially outermost boundary of the upper bifurcation inset portion. The flange attachment boundary may further have a lower terminal edge having a radially outermost boundary of the lower bifurcation inset portion. The flange attachment boundary may further have an aft terminal edge having an axially aft most boundary of at least one of: the upper bifurcation inset portion, the lower bifurcation inset portion and the central inset portion. Moreover, the flange attachment boundary may further have a forward terminal edge having an axially forward most boundary of at least one of the upper bifurcation inset portion, the lower bifurcation inset portion, and the central inset portion.

In various embodiments, a hybrid inner fixed structure may have an inner fixed structure panel having an inner fixed structure panel surface and a inset panel having a inset panel surface disposed in at least partial contact with the inner fixed structure panel surface. The inset panel may have a honeycomb material having an inner honeycomb disposed between a first skin and a second skin, whereby the inset panel provides thermal insulation to the inner fixed structure panel surface.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, phrases such as "make contact with," "coupled to," "touch," "interface with" and "engage" may be used interchangeably.

In various embodiments, an hybrid inner fixed structure comprises an inner fixed structure panel and a inset panel. The inner fixed structure panel may have an inner fixed structure panel surface. In various embodiments, the inset panel has a inset panel surface. The inset panel surface is disposed in at least partial contact with the inner fixed structure panel surface. For example, the inset panel surface may be disposed in at least partial contact with a first portion of the inner fixed structure panel surface, wherein the first portion is disposed on a flange of the inner fixed structure panel. For example, with reference to FIGS. 1 and 3, in various embodiments a hybrid inner fixed structure 2 may comprise an inner fixed structure panel 4 and a inset panel 6. The inner fixed structure panel 4 may have an inner fixed structure panel surface 10. The inner fixed structure panel surface 10 may comprise a first portion 78 disposed on a flange 80 of the inner fixed structure panel 4. With momentary emphasis on FIG. 3, flange 80 may be a stepped flange so that the inner fixed structure panel 4 mounts flush with the inset panel 6.

Figure 3:
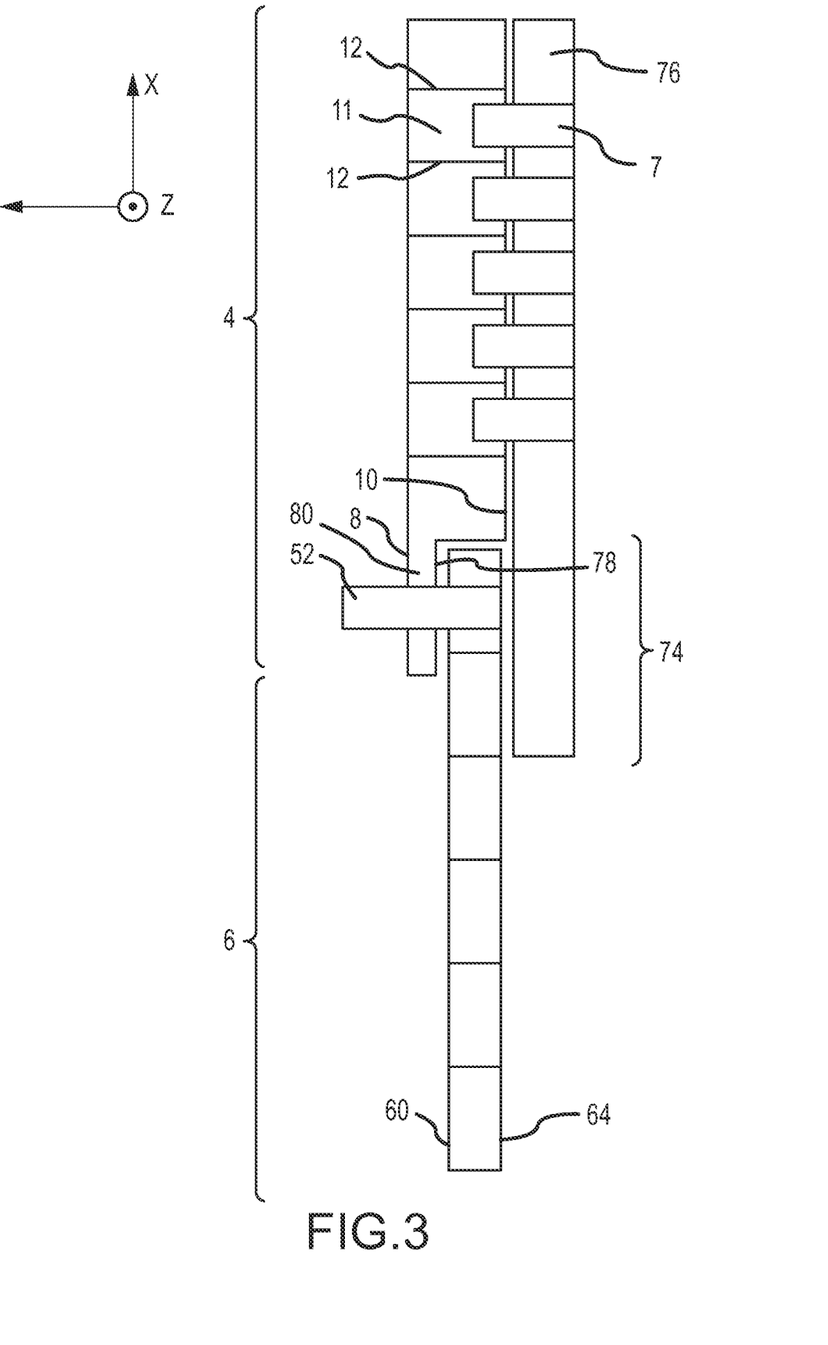
FIG. 3 illustrates various aspects of a hybrid inner fixed structure featuring honeycomb panels according to various embodiments.

The inset panel 6 has a inset panel surface 60. The inset panel surface 60 is disposed in at least partial contact with the first portion 78 of the inner fixed structure panel surface 10. For example, the inset panel surface 60 may be disposed in at least partial contact with a first portion 78 of the inner fixed structure panel surface 10, whereby the inset panel 6 provides a section of hybrid inner fixed structure 2 with improved heat tolerance, yet without a need for heat blankets thereupon. The first portion 78 may be a section of the inner fixed structure panel 4 defined by a flange attachment boundary 5. In this manner, flange attachment boundary 5 may define the boundary between a portion of the hybrid inner fixed structure 2 made up of the inset panel 6, and a portion of the hybrid inner fixed structure 2 made up of the inner fixed structure panel 4. Moreover, as one may appreciate, the first skin 64 of the inset panel 6 may be thus aligned flush with the portion of the inner fixed structure panel surface 10 that is not disposed on flange 80.

The hybrid inner fixed structure 2 may also comprise a heat blanket 76. Heat blanket 76 may be disposed in at least partial contact with the inner fixed structure panel surface 10. The heat blanket 76 may overlap a portion of the inset panel 6 comprising an overlap region 74. Overlap region 74 may comprise a portion of the inset panel 6 lying in contact with the first portion 78 of the inner fixed structure panel 4. In some embodiments, overlap region 74 may comprise a portion of the inset panel 6 opposite the flange 80. Overlap region 74 may comprise a 4 inch (+− 0.5 inch) margin of the inset panel 6 although any dimensions adapted to ameliorate damage, for example due to leakage at the juncture of the inner fixed structure panel 4 and the inset panel 6 may be implemented.

In various embodiments, an inner fixed structure panel 4 may further comprise a hinge beam, an upper bifurcation, a center member, a lower bifurcation, and a latch beam. For example, with reference to FIGS. 1 and 2, an inner fixed structure panel 4 may comprise a hinge beam 32, an upper bifurcation 34, a center member 36, a lower bifurcation 38, and a latch beam 40.

Figure 2:
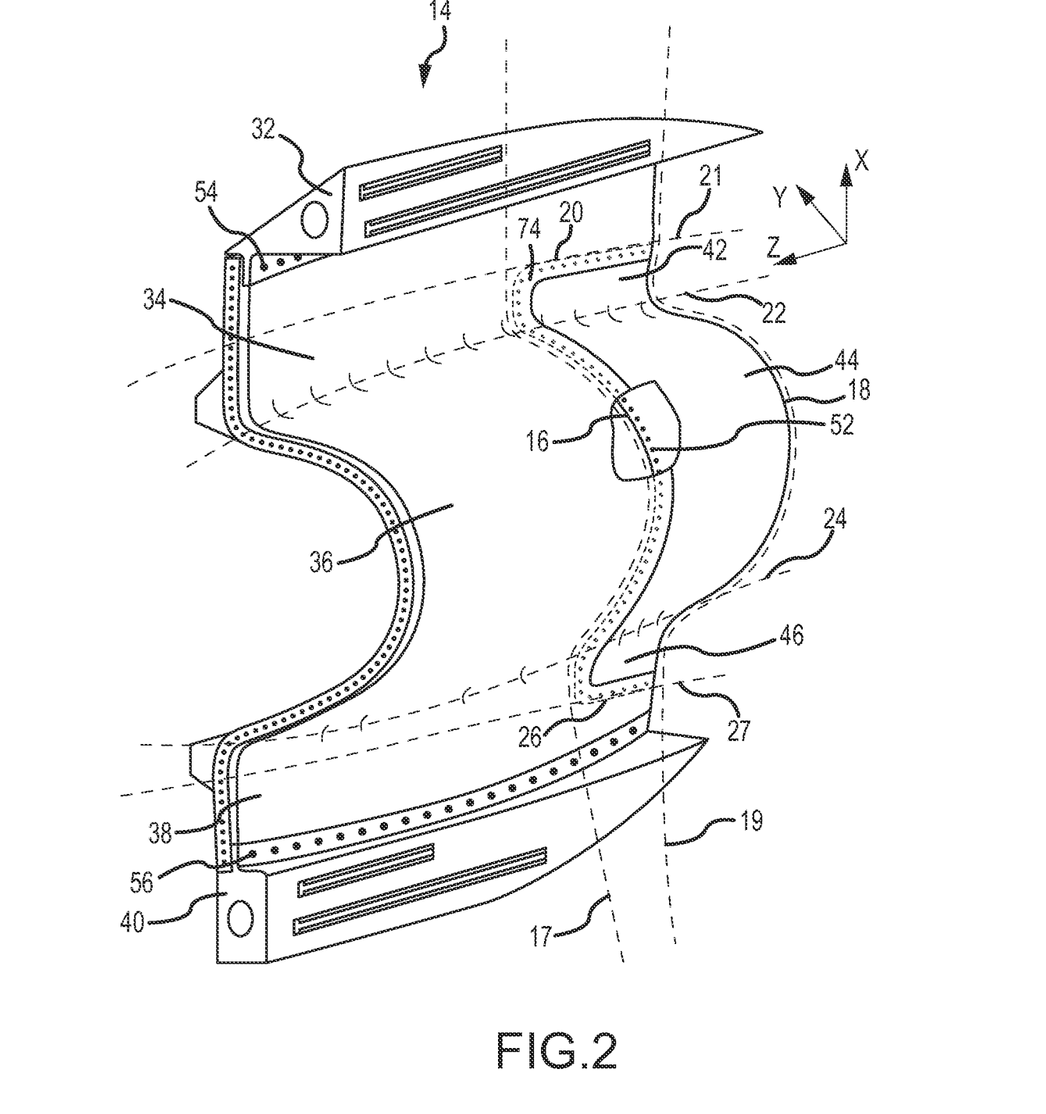
FIG. 2 illustrates various aspects of a hybrid inner fixed structure according to various embodiments.

In various embodiments, center member 36 may be generally cylindrical, for example, center member 36 may not be precisely cylindrical, but may have compound curvature or may have a primary curvature about an axis parallel the Z-axis illustrated in FIG. 2, but may also have a lesser curvature about an axis parallel to the X-axis illustrated in FIG. 2, so that the center member 36 comprises multiple curvatures and/or compound curvatures.

Center member 36 may comprise an upper boundary 22 wherein the center member 36 unites integrally with an upper bifurcation 34 at upper boundary 22. In various embodiments, upper boundary 22 lies at a location on the surface of center member 36 wherein a tangent of the surface of center member 36 lies in the Y-Z plane as illustrated in FIG. 2. In various embodiments, upper boundary 22 is a curved line, for instance, upper bifurcation 34 extends radially outward in a Y direction as illustrated in FIG. 2, but may further comprise curvature, such as curvature about an axis also extending in the Y direction. Thus, upper boundary 22 may comprise an arc lying in a Y-Z plane wherein the center member 36 unites integrally with an upper bifurcation 34.

Similarly, center member 36 may comprise a lower boundary 24. In various embodiments, center member 36 unites integrally with a lower bifurcation 38 at lower boundary 24. In various embodiments, lower boundary 24 lies at a location on the surface of center member 36 wherein a tangent of the surface of center member 36 lies in the Y-Z plane as illustrated in FIG. 2. Lower boundary 24 may be a curved line, for instance, lower bifurcation 38 extends radially outward in a negative-Y direction as illustrated in FIG. 2, but may further comprise curvature, such as curvature about an axis also extending in the negative-Y direction. Thus, lower boundary 24 may comprise an arc lying in a Y-Z plane wherein the center member 36 unites integrally with a lower bifurcation 38.

The upper bifurcation 34 and center member 36 may be an integral panel such that upper bifurcation 34 and center member 36 are formed from a single piece of material. For example, the upper bifurcation 34 and the center member 36 may be made from a single formed panel, rather than from separate panels joined together. In various embodiments, however, the upper bifurcation 34 and the center member 36 are multiple pieces of material and are joined at upper boundary 22.

The lower bifurcation 38 and center member 36 may be an integral panel such that lower bifurcation 38 and center member 36 are formed from a single piece of material. For example, the lower bifurcation 38 and the center member 36 may be made from a single formed panel, rather than from separate panels joined together. In various embodiments, however, the lower bifurcation 38 and the center member 36 are multiple pieces of material and are joined at lower boundary 24.

The upper bifurcation 34 and the lower bifurcation 38 may comprise members integrally formed with the center member 36. Upper bifurcation 34 may extend radially outward from the center member 36 at the upper boundary 22. In some embodiments, the upper bifurcation 34 is curved so that a cross-section may comprise an arc lying in a Y-Z plane. Lower bifurcation 38 may extend radially outward from the center member 36 at the lower boundary 24. The lower bifurcation 38 may be curved so that a cross-section may comprise an arc lying in the Y-Z plane. In some embodiments, the cross-section of the upper bifurcation 34 and the cross section of the lower bifurcation 38 comprise the same arc.

With reference to the various arcs of the upper boundary 22, the lower boundary 24, the upper bifurcation 34, and the lower bifurcation 38, the radius of each of the various arcs may be non-constant among cross-sectional planes crossing different points on the Y-axis. Moreover, the arcs of the upper boundary 22, the lower boundary 24, the upper bifurcation 34 and the lower bifurcation 38 may be oval, or non-circular, or may be curved shapes, or may be lines in lieu of arcs, or may be a combination of shapes.

The upper bifurcation 34 may be joined to a hinge beam 32. For example, the upper bifurcation 34 and the hinge beam 32 may be joined by fasteners 54. Similarly, the lower bifurcation 38 may be joined to a latch beam 40 by fasteners 56.

In accordance with various embodiments, the latch beam 40 may comprise machined aluminum. Similarly, in accordance with various embodiments, the hinge beam 32 may comprise machined aluminum. However, either or both of the hinge beam 32 and the latch beam 40 may be integrated into the upper bifurcation 34 and the lower bifurcation 38, respectively. In this manner, the principles disclosed herein may be implemented in conjunction with an inner fixed structure panel 4 wherein the upper bifurcation 34 comprises a hinge beam 32 that is integrated into the upper bifurcation 34, rather than being joined to a hinge beam 32 by fasteners 54. Similarly, the principles disclosed herein may be implemented in conjunction with an inner fixed structure panel 4 wherein the lower bifurcation 38 comprises a latch beam 40 that is integrated into the lower bifurcation 38, rather than being joined to a latch beam 40 by fasteners 56.

In various embodiments, a inset panel may comprise a central inset portion, an upper bifurcation inset portion, and a lower bifurcation inset portion. For example, with reference to FIGS. 1 and 2, a inset panel 6 may comprise a central inset portion 44, an upper bifurcation inset portion 42, and a lower bifurcation inset portion 46. The central inset portion 44 may be adapted to mechanically connect in whole or in part with the center member 36 of the inner fixed structure panel 4. Similarly, the lower bifurcation inset portion 46 may be adapted to mechanically connect in whole or in part with the lower bifurcation 38 of the inner fixed structure panel 4. Moreover, the upper bifurcation inset portion 42 may be adapted to mechanically connect in whole or in part with the upper bifurcation 34 of the inner fixed structure panel 4. Moreover, the central inset portion 44, upper bifurcation inset portion 42, and lower bifurcation inset portion 46 may be configured mechanically connect along a flange 80 of the inner fixed structure panel 4 so that the juncture may be said to be non-discontinuous; that is the mathematical limit of an equation of the surface approaching the juncture along flange 80 from either a positive or a negative direction along any given line may be said to be the same. The upper bifurcation inset portion 42 may be shaped to only extend to replace the part of the upper bifurcation 34 exposed to high temperatures and the lower bifurcation inset portion 46 may be shaped to only extend to replace the part of the lower bifurcation 38 exposed to high temperatures and the central inset portion 44 may be shaped to only extend to replace the part of the center member 36 exposed to high temperatures. Thus, as one having experience in the art will recognize, the heat tolerance of the hybrid inner fixed structure 2 may be enhanced, yet the weight of the inner fixed structure may be minimized via minimizing the size of the inset panel 6 to only those portions exposed to high temperatures. Similar to the inner fixed structure panel 4, the inset panel 6 may comprise a unitary piece of material formed to approximate various contours of the inner fixed structure panel 4.

Figure 1:
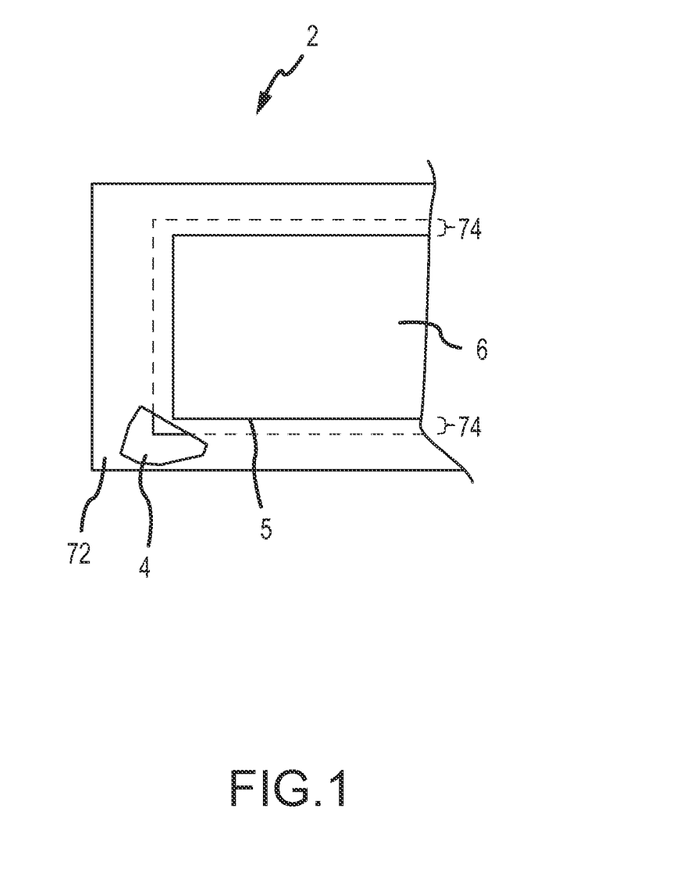
FIG. 1 illustrates a block diagram illustrating various functional relationships of a hybrid inner fixed structure according to various embodiments.

The inset panel 6 may be bounded by a flange attachment boundary 5. For example, the flange attachment boundary 5 comprises an upper terminal edge, a lower terminal edge, and aft terminal edge and a forward terminal edge. With reference to FIGS. 1 and 2, a inset panel 6 comprising a central inset portion 44, a upper bifurcation inset portion 42, and a lower bifurcation inset portion 46 may be bounded by a flange attachment boundary 5 comprising an upper terminal edge 20, a lower terminal edge 26, a forward terminal edge 16 and an aft terminal edge 18.

Figure 4:
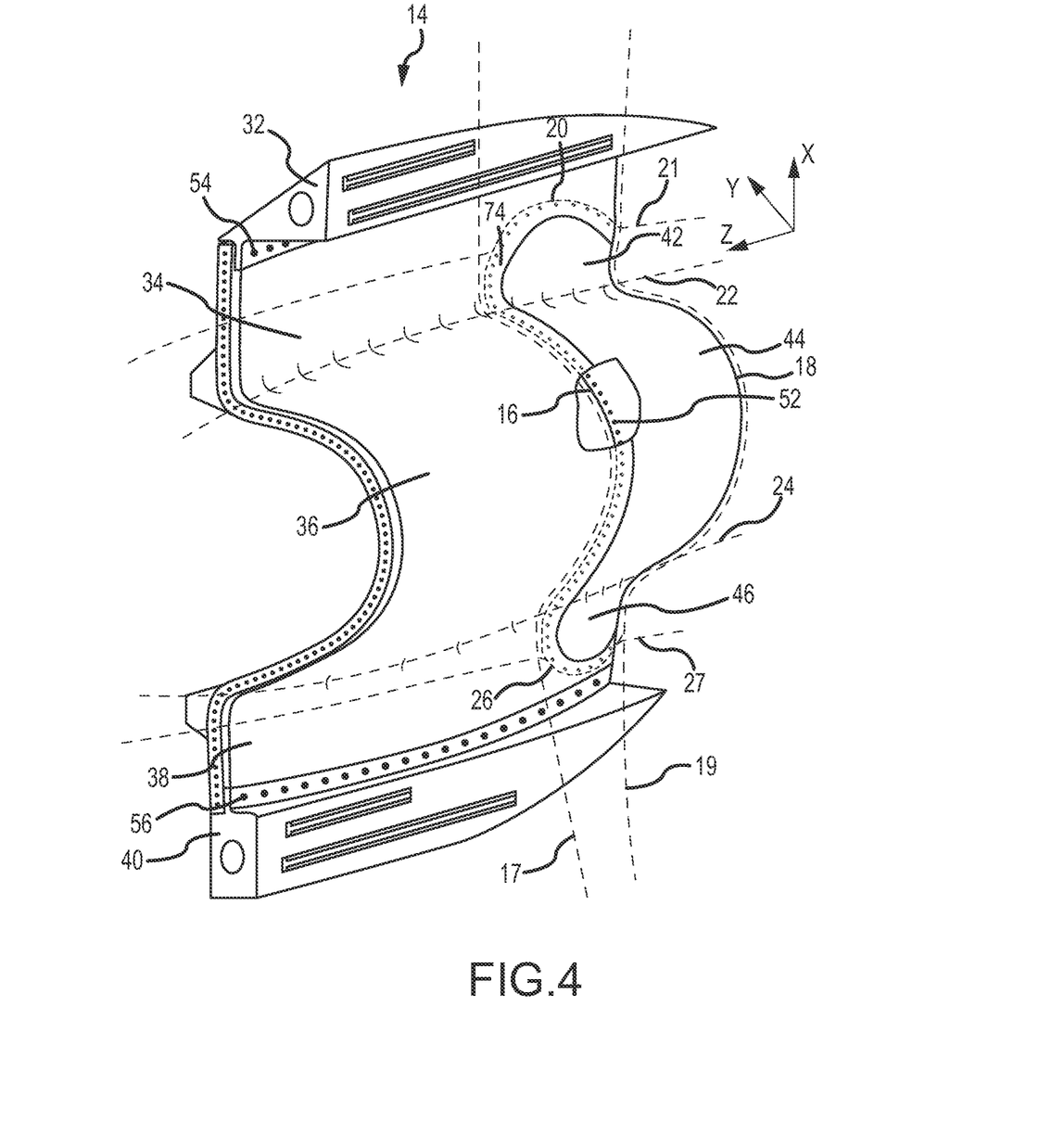
FIG. 4 illustrates various aspects of a hybrid inner fixed structure having a inset panel with various non-linear sides according to various embodiments.

The upper terminal edge 20 may comprise a boundary of the upper bifurcation inset portion 42. The upper terminal edge 20 may be disposed at a line 21 transiting the surface of the upper bifurcation 34 of the inner fixed structure panel 4. In this manner, only a portion of the upper bifurcation 34 is replaced by the upper bifurcation inset portion 42 of the inset panel 6. With momentary reference to FIG. 4, in various embodiments, the upper terminal edge 20 is not a line, comprises an irregular shape. For example, the upper terminal edge 20 comprises a curve, or a series of curves, or a series of lines, or an irregular shape, or any combination of shapes.

The lower terminal edge 26 may comprise a boundary of the lower bifurcation inset portion 46. The lower terminal edge 26 may be disposed at a line 27 transiting the surface of the lower bifurcation 38. In this manner, only a portion of the lower bifurcation 38 of the inner fixed structure panel 4 is replaced by the lower bifurcation inset portion 46 of the inset panel 6. With momentary reference to FIG. 4, in various embodiments, the lower terminal edge 26 is not a line but comprises an irregular shape. For example, the lower terminal edge 26 comprises a curve, or a series of curves, or a series of lines, or an irregular shape, or any combination of shapes.

The aft terminal edge 18 may comprise a boundary of the lower bifurcation inset portion 46, and the central inset portion 44, and the upper bifurcation inset portion 42. The aft terminal edge 18 may be disposed at a line 19 transiting the surface of the upper bifurcation 34, then transitioning to follow the surface of the center member 36, and then transitioning to transiting the surface of the lower bifurcation 38. In this manner, only a portion of the lower bifurcation 38 is replaced by the lower bifurcation inset portion 46, only a portion of the upper bifurcation 34 is replaced by the upper bifurcation inset portion 42, and only a portion of the center member 36 is replaced by the central inset portion 44 of the inset panel 6. With momentary reference to FIG. 4, in various embodiments, the aft terminal edge 18 is not a line, comprises an irregular shape. For example, the aft terminal edge 18 comprises a curve, or a series of curves, or a series of lines, or an irregular shape, or any combination of shapes.

The aft terminal edge 18 may be a discontinuous line. The aft terminal edge 18 may be disposed at a line 19 transiting the surface of the upper bifurcation 34, then transitioning to follow the surface of the center member 36, and then transitioning to transiting the surface of the lower bifurcation 38 but at various points may be disposed at a more positive or at a more negative point along the Z axis. For example, the aft terminal edge 18 may be discontinuous such that the aft terminal edge 18 comprises a boundary of the lower bifurcation inset portion 46, and the central inset portion 44, and the upper bifurcation inset portion 42, wherein the boundaries of the different portions are not co-linear, for example, any of the upper bifurcation inset portion 42, the lower bifurcation inset portion 46, and the central inset portion 44 may extend more or less in the Z axis than any other portion, depending on the desired shape of the hybrid inner fixed structure 2. In this manner, inset portion may comprise any shape adapted to provide desired properties.

The forward terminal edge 16 may comprise a boundary of the lower bifurcation inset portion 46, and the central inset portion 44, and the upper bifurcation inset portion 42. The forward terminal edge 16 may be disposed at a line 17 transiting the surface of the upper bifurcation 34, then transitioning to follow the surface of the center member 36, and then transitioning to lie disposed at a line transiting the surface of the lower bifurcation 38. In this manner, only a portion of the lower bifurcation 38 is replaced by the lower bifurcation inset portion 46, only a portion of the upper bifurcation 34 is replaced by the upper bifurcation inset portion 42, and only a portion of the center member 36 is replaced by the central inset portion 44 of the inset panel 6. With momentary reference to FIG. 4, in various embodiments, the forward terminal edge 16 is not a line, comprises an irregular shape. For example, the forward terminal edge 16 comprises a curve, or a series of curves, or a series of lines, or an irregular shape, or any combination of shapes.

The forward terminal edge 16 may be a discontinuous line. The forward terminal edge 16 may be disposed at a line transiting the surface of the upper bifurcation 34, then transitioning to follow the surface of the center member 36, and then transitioning to transiting the surface of the lower bifurcation 38 but at various points may be disposed at a more positive or at a more negative point along the Z axis. For example, the forward terminal edge 16 may be discontinuous such that the forward terminal edge 16 comprises a boundary of the lower bifurcation inset portion 46, and the central inset portion 44, and the upper bifurcation inset portion 42, wherein the boundaries of the different portions are not co-linear, for example, any of the upper bifurcation inset portion 42, the lower bifurcation inset portion 46, and the central inset portion 44 may extend more or less in the Z axis than any other portion. In this manner, inset portion may comprise any shape adapted to provide desired properties.

As used herein, the term "radially outermost" may mean any of the following. First, a position lying along a path extending from the center point of the center member 36 of the inner fixed structure panel 4 may be said to be radial. The position may be an edge of the inset panel 6 furthest from the center point of the center member 36. Thus, the position may be said to be outermost. In this manner, an edge of the inset panel 6 furthest from the center of the center member 36 may be said to be the radially outermost edge of the inset panel 6. Thus, as will be discussed further herein, an upper terminal edge 20 may be the radially outermost edge of the inset panel 6, and a lower terminal edge 26 may be another radially outermost edge of the inset panel 6.

Similarly, the term "radially inward" may mean a position lying along a path extending from the center point of the center member 36 of the inner fixed structure panel 4 which lies nearer to the center point of the center member 36 than a point the position is "radially inward" of. Similarly, a position disposed at the negative most point of the Z-axis along a inset panel 6 as illustrated in FIG. 2 may be said to be an aft terminal edge 18 of the inset panel 6, while a position disposed at the positive most point of the Z-axis as illustrated in FIG. 2 may be said to be a forward terminal edge 16 of the inset panel 6.

Thus, the flange attachment boundary 5 may comprise an upper terminal edge 20 of the inset panel 6 composing a radially outermost boundary of the upper bifurcation inset portion 42. The flange attachment boundary 5 may further comprise a lower terminal edge 26 of the inset panel 6 comprising a radially outermost boundary of the lower bifurcation inset portion 46. Moreover, the flange attachment boundary 5 may comprise an aft terminal edge 18 of an inset panel 6 comprising an axially aft most boundary of at least one of: the upper bifurcation inset portion 42, the lower bifurcation inset portion 46, and the central inset portion 44. Finally, the flange attachment boundary 5 may comprise a forward terminal edge 16 comprising an axially forward most boundary of at least one of the upper bifurcation inset portion 42, the lower bifurcation inset portion 46, and the central inset portion 44.

The inset panel 6 and the inner fixed structure panel 4 may be joined by fasteners. For example, with reference to FIGS. 1 and 2, an inset panel 6 and inner fixed structure panel 4 may be joined by fasteners 52 extending through flange 80. In various embodiments, fasteners 52 comprise rivets. However, fasteners 52 may comprise screws, bolts, welds, brazing, or any other structure by which the inset panel 6 and the inner fixed structure panel 4 may be joined. The fasteners 52 may comprise fasteners mounted flush to the first skin 64 of the inset panel 6. For instance, the fasteners 52 may be countersunk, counterbored, or otherwise mounted flush to the first skin 64 of the inset panel 6 so that airflow is not impeded. Fasteners 52 may comprise one row, may comprise two rows, or may comprise any number of rows. Fasteners 52 may be covered by overlap region 74, although fasteners 52 may be exposed, for example, if overlap region 74 does not extend sufficiently far over the first skin 64 opposite of the flange 80 to cover the fasteners 52 flange attachment boundary 5, Now having discussed various aspects of a hybrid inner fixed structure 2, various aspects of a hybrid inner fixed structure 2 may be made from honeycomb materials. For example, with reference to FIG. 3, an inner fixed structure panel 4 may comprise a honeycomb material. For example, an internal honeycomb may be disposed between a first skin and an inner fixed structure panel surface 10. In various embodiments, an inner fixed structure panel 4 comprises an internal honeycomb 12 disposed between a first skin 8, and an inner fixed structure panel surface 10. In this manner, pockets 11 may be formed within the inner fixed structure panel 4 whereby the insulative properties of the panel may be enhanced. In various embodiments, an inner fixed structure panel 4 may comprise a sheet architecture, or may comprise a sheet and stringer architecture, or may comprise any architecture configured to provide support and desired thermal properties to the panel. In various embodiments, an inner fixed structure may comprise a combination of different architectures. For example, an inner fixed structure panel 4 may comprise a combination of honeycomb and reinforcing stringers. The inner fixed structure panel 4 may further comprise an acoustical treatment. For example, holes 7 may be placed across the surface of the inner fixed structure panel 4 whereby noise may be attenuated.

Similarly, and also with reference to FIG. 3, an inset panel 6 may comprise a honeycomb material. For example, an inner honeycomb may be disposed between a first skin and an inset panel surface. In various embodiments, an inset panel 6 comprises an inner honeycomb 62 disposed between an inset panel surface 60, and a first skin 64. In this manner, pockets 63 may be formed within the inset panel 6 whereby the insulative properties of the panel may be enhanced. In various embodiments, an inset panel 6 may comprise a sheet architecture, or may comprise a sheet and stringer architecture, may comprise a combination of honeycomb and reinforcing stringers, or may comprise any architecture configured to provide support and desired thermal properties to the panel.

Now, having described various components of hybrid inner fixed structures, various components of hybrid inner fixed structures may be manufactured from various materials. In various embodiments, various components of hybrid inner fixed structures may comprise titanium. However, in further embodiments, various components of hybrid inner fixed structures may comprise other heat tolerant materials, for example graphite, or composites or metals, such as tungsten, aluminum, steel, alloys, or a austenitic nickel-chromium-based alloy such as Inconel® which is available from Special Metals Corporation of New Hartford, N.Y., USA, though they may further comprise numerous other materials configured to provide mechanical resiliency and/or support of the system when subjected to wear in an operating environment or to satisfy other desired electromagnetic, chemical, physical, or biological properties such as strength, durability, ductility, heat tolerance, thermal dissipation, and footprint constraints, among others. In various embodiments, various portions of hybrid inner fixed structures as disclosed herein are made of different materials or combinations of materials, and/or may comprise coatings.

In various embodiments, an inner fixed structure panel may comprise graphite skins with an epoxy-bonded core made of metal, such as aluminum or titanium. Alternatively, an inner fixed structure panel may comprise graphite skins with a fiber core. However, an inner fixed structure panel may be made of aluminum, titanium, steel, Inconel®, polyimide, or any other material or any combination of materials having desired material properties.

An inset panel may comprise a honeycomb material wherein the material is titanium. For example, the inset panel comprising a honeycomb titanium material may be made from various processes. For example, the panel may be manufactured by a process comprising titanium liquid interface diffusion. Moreover, the process comprising titanium liquid interface diffusion may further comprise a Delta-P process or a Delta-Alpha process.

For example, the process comprising titanium liquid interface diffusion may comprise a Delta-P process. Pressure may be applied to an inset panel under a constant temperature. In various embodiments, a Delta-Alpha process may be implemented. For example, the expansion of tooling may create pressure whereby the inset panel may be formed. In various embodiments, various different methods may be used to form various different aspects of an inset panel. For example, a planar portion, for example, the upper bifurcation inset portion 42 of a inset panel 6 and the lower bifurcation inset portion 46 of a inset panel 6 may be formed by a Delta-P process, whereas the central inset portion 44 of a inset panel 6 may be formed by a Delta-Alpha process.

One having experience in the art will appreciate in light of the disclosure herein, that a hybrid inner fixed structure according to the principles herein may have reduced need for thermal blanket protection. Thus, the durability of the structure may be increased and failure modes associated with thermal blankets eliminated. Moreover, the volume of space occupied by the inner fixed structure may be reduced, for example, by elimination of the thermal blankets. As such, the flow of air through the engine may be improved by the corresponding reduction in drag. Still furthermore, various other structures may be reduced in size, for example, a translating sleeve component external to the inner fixed structure whereby the thrust reversers may be deployed. The reduction in volume occupied by the inner fixed structure further facilitates reduction in volume occupied by these other components, for example, a translating sleeve component, and thus multiplies the reduction in weight advantageously effected by the disclosure herein.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A hybrid inner fixed structure comprising:
   an inner fixed structure panel having an inner fixed structure panel surface;
   an inset panel having an inset panel surface disposed in at least partial contact with a first portion of the inner fixed structure panel surface; and
   wherein the first portion of the inner fixed structure panel comprises a flange defined by a flange attachment boundary and whereby the inset panel mounts flush with the inner fixed structure panel,
   wherein the inner fixed structure panel comprises:
      an upper bifurcation;
      a center member comprising an upper boundary and a lower boundary; and
      a lower bifurcation,
         wherein the upper bifurcation unites with the center member at the upper boundary, wherein the lower bifurcation unites with the center member at the lower boundary, wherein the upper bifurcation extends substantially normal to the surface of the center member at the upper boundary, wherein the lower bifurcation extends substantially normal to the surface of the center member at the lower boundary, and wherein at least one of the upper bifurcation, the center member, and the lower bifurcation is disposed in at least partial contact with the first portion of the inner fixed structure panel surface.

2. The hybrid inner fixed structure according to claim 1, wherein the inner fixed structure panel and the inset panel are joined by rivets.

3. The hybrid inner fixed structure according to claim 1, wherein the inset panel comprises a honeycomb material comprising an inner honeycomb disposed between a first skin and the inset panel surface.

4. The hybrid inner fixed structure according to claim 1, wherein the inner fixed structure panel comprises a honeycomb material comprising an inner honeycomb disposed between a first skin and the inner fixed structure panel surface.

5. The hybrid inner fixed structure according to claim 1, wherein the inner fixed structure panel comprises graphite.

6. The hybrid inner fixed structure according to claim 1, wherein the inset panel comprises titanium.

7. The hybrid inner fixed structure panel according to claim 1, further comprising:
a hinge beam coupled to the upper bifurcation by an upper bifurcation fastener; and
a latch beam coupled to the lower bifurcation by a lower bifurcation fastener.

8. The hybrid inner fixed structure according to claim 7, wherein the hinge beam comprises machined aluminum, and
wherein the latch beam comprises machined aluminum.

9. The hybrid inner fixed structure panel according to claim 1,
wherein the upper bifurcation comprises an integrated hinge beam; and
wherein the lower bifurcation comprises an integrated latch beam.

10. The hybrid inner fixed structure of claim 1, further comprising a heat blanket disposed in at least partial contact with the inner fixed structure panel surface, wherein the heat blanket overlaps a portion of the inset panel comprising an overlap region.

11. A hybrid inner fixed structure comprising:
an inner fixed structure panel having an inner fixed structure panel surface;
an inset panel having an inset panel surface disposed in at least partial contact with a first portion of the inner fixed structure panel surface; and
wherein the first portion of the inner fixed structure panel comprises a flange defined by a flange attachment boundary and whereby the inset panel mounts flush with the inner fixed structure panel,
wherein the inset panel comprises:
a central inset portion adapted to connect with a portion of a central cylindrical member of the inner fixed surface defined by the flange attachment boundary;
an upper bifurcation inset portion adapted to connect with a portion of a upper bifurcation portion of the inner fixed surface defined by the flange attachment boundary; and
a lower bifurcation inset portion adapted to connect with a portion of a lower bifurcation portion of the inner fixed surface defined by the flange attachment boundary, wherein the flange attachment boundary comprises:
an upper terminal edge composing a radially outermost boundary of the upper bifurcation inset portion;
a lower terminal edge comprising a radially outermost boundary of the lower bifurcation inset portion;
an aft terminal edge comprising an axially aft most boundary of at least one of: the upper bifurcation inset portion, the lower bifurcation inset portion and the central inset portion; and
a forward terminal edge comprising an axially forward most boundary of at least one of the upper bifurcation inset portion, the lower bifurcation inset portion, and the central inset portion, and
wherein the upper terminal edge is disposed at a position radially inward of the radially outermost edge of the upper bifurcation portion.

12. The hybrid inner fixed structure of claim 11, further comprising a heat blanket disposed in at least partial contact with the inner fixed structure panel surface, wherein the heat blanket overlaps a portion of the inset panel comprising an overlap region.

13. A hybrid inner fixed structure comprising:
an inner fixed structure panel having an inner fixed structure panel surface;
an inset panel having an inset panel surface disposed in at least partial contact with a first portion of the inner fixed structure panel surface; and
wherein the first portion of the inner fixed structure panel comprises a flange defined by a flange attachment boundary and whereby the inset panel mounts flush with the inner fixed structure panel,
wherein the inset panel comprises:
a central inset portion adapted to connect with a portion of a central cylindrical member of the inner fixed surface defined by the flange attachment boundary;
an upper bifurcation inset portion adapted to connect with a portion of a upper bifurcation portion of the inner fixed surface defined by the flange attachment boundary; and
a lower bifurcation inset portion adapted to connect with a portion of a lower bifurcation portion of the inner fixed surface defined by the flange attachment boundary, wherein the flange attachment boundary comprises:
an upper terminal edge composing a radially outermost boundary of the upper bifurcation inset portion;
a lower terminal edge comprising a radially outermost boundary of the lower bifurcation inset portion;
an aft terminal edge comprising an axially aft most boundary of at least one of: the upper bifurcation inset portion, the lower bifurcation inset portion and the central inset portion; and
a forward terminal edge comprising an axially forward most boundary of at least one of the upper bifurcation inset portion, the lower bifurcation inset portion, and the central inset portion, and
wherein the lower terminal edge is disposed at a position radially inward of the radially outermost edge of the lower bifurcation portion.

14. The hybrid inner fixed structure of claim 13, further comprising a heat blanket disposed in at least partial contact with the inner fixed structure panel surface, wherein the heat blanket overlaps a portion of the inset panel comprising an overlap region.

* * * * *